United States Patent [19]

Jansen et al.

[11] Patent Number: 4,537,407
[45] Date of Patent: Aug. 27, 1985

[54] APPARATUS FOR TESTING PIPES BY A PIPE TESTER

[75] Inventors: Herbert Jansen, Glehn; Hans-Gunter Schiffers, Monchen-Gladbach; Richard Gerretz, Viersen, all of Fed. Rep. of Germany

[73] Assignee: Mannesmann Demag Wean, Coraopolis, Pa.

[21] Appl. No.: 584,372

[22] Filed: Feb. 28, 1984

[30] Foreign Application Priority Data

Mar. 2, 1983 [DE]  Fed. Rep. of Germany ....... 3307813

[51] Int. Cl.³ .............................................. F16J 15/12
[52] U.S. Cl. ........................................... 277/2; 277/34
[58] Field of Search ......................... 277/2, 3, 34, 34.3

[56] References Cited

U.S. PATENT DOCUMENTS 3,171,381  3/1965  Meek .................................. 277/34
3,207,221  9/1965  Cochran ................................. 277/2
3,764,037  10/1973  Rothrock ........................... 277/34.3
3,815,925  6/1974  Mattoon ................................ 277/2
4,295,653  10/1981  Coles ..................................... 277/2
4,394,021  7/1983  Merilä277 .............................. 34.3/

Primary Examiner—Robert I. Smith
Attorney, Agent, or Firm—Daniel Patch; Suzanne Kikel

[57] ABSTRACT

A sealing arrangement around an end of a pipe received in a testhead of a hydraulic pipe testing apparatus, which sealing arrangement consists of an elastic sealing ring and an adjacent, rigid support ring of varying diameters. Both rings are mounted in radial recesses in the testhead and encircle the pipe upon its entry into the testhead. The recess for the elastic sealing ring consists of a flat ring located between the sealing ring and the rigid support ring. For a sealing condition, the support ring is contracted to abut the pipe and the sealing ring is caused to be deformed whereby it flows radially outwardly from its recess against the pipe and axially along the pipe towards and away from the pipe's end. In the axial direction away from the end of the pipe, the sealing ring flows around the flat ring to abut the rigid support ring.

12 Claims, 4 Drawing Figures

APPARATUS FOR TESTING PIPES BY A PIPE TESTER

The invention relates to a sealing arrangement used in a pipe tester used for testing the quality of pipes by introducing hydraulic pressure into the pipe. More particularly, the sealing arrangement consists of a housing into which the end of the pipe to be tested is introduced at one end and is acted upon from the other side by the pressure medium being fed into the interior of the pipe.

A well-known prior sealing arrangement for an hydraulic pressure testing apparatus for pipes (DE-AS No. 26 40 221) consists of a housing having a sealing ring made of an elastic rubber material which is pressed around and against the circumference of a pipe to be tested and the front surfaces of which abut tightly the front surfaces of a recess in the housing. Pressure plates or thrust pieces of hard material are coaxially arranged to press against the inner surface of the sealing ring in a manner that upon a radial compression of the sealing ring, these pressures plates are also moved radially with the sealing ring. These pressure plates overlap one another radially.

A disadvantage of this sealing arrangement is that the testing pressure for the pipe acts axially upon the sealing ring wherein the elastic rubber material of the ring begins to creep or is pulled away from the circumference of the pipe under the influence of the high testing pressure, so that the testing water under pressure tends to escape. This prior sealing arrangement takes up the axial loading by means of these thrust pieces which overlap one another in the axial direction, and thus provide support of the sealing ring in an axial direction.

The pressure plates worked or embedded into the sealing ring must, in conjunction with radial compression of the sealing ring, be able to move radially with this sealing ring which means there must exist a tight fit between the elastic sealing ring and the rigid plates. The sealing rings for this type of arrangement must, therefore, be such as to meet these requirements. These sealing rings have proven to be extremely expensive since they must be such that the highest possible service life of the sealing ring is obtained. In addition, the sealing rings are subject to wear as a result of their varying load and therefore must often be replaced by a new sealing ring. This is very costly due to the expensive design requirements for the sealing ring.

Therefore, an object of the subject invention is to provide a sealing arrangement in a pipe testing apparatus which involves less expenditure; is simple to manufacture; and which can easily be replaced.

In particular, it is an object of the subject invention to provide in a sealing assembly for a pipe tester or the like, in which fluid under pressure is introduced into the interior of the pipe and the ends of the pipe are sealed, comprising a housing having an aperture for receiving said end of said pipe, sealing ring means in said aperture through which said pipe is caused to pass constructed in a manner to be deformable in opposite axial directions and radially towards and away from said pipe such that when deformed it will contact the external circumference of said pipe to form a sealing condition, supporting ring means arranged concentric to said pipe and adjacent said deformable sealing ring and to one side thereof, and constructed in a manner to contact said external circumference of said pipe and to control the extent of said deformation of said sealing ring means in a said axial direction on said one side when said sealing ring means is deformed, means for introducing pressure against said supporting ring means to effect its said contact against said pipe and said deformation of said sealing ring means and forming means arranged in said aperture adjacent to and on both sides of said sealing ring means in a manner to cause said sealing ring means when deformed to be displaced in said opposite axial directions with respect to said pipe, and to create a sealing surface substantially larger in said deformed condition than in said non-deformed condition of said sealing ring means.

One of the basic concepts of the present invention consists of the fact that the known axial support for the sealing ring is to be separated from the actual sealing ring in order to be able to leave these support elements, which are expensive to machine and subject to wear, in the housing when the worn elastic sealing ring must be replaced. Thus, the sealing arrangement of the present invention includes the employment of at least three cooperative elements: a radial support ring consisting of the known several radially arranged support elements; a flat support ring which takes up the axial forces; and an elastic sealing ring which is capable of withstanding the required degree of deformation.

In accordance with the teachings of the present invention, there is provided a rotary piston which acts upon the sealing ring axially on its front side to deform the elastic sealing ring. This rotary piston, in turn is directly acted upon by the testing pressure. Such a rotary piston causes the sealing ring to be pressed radially against an area of the pipe which is to be tested. The sealing ring of the subject invention is designed such that its replacement is easy, it is inexpensive and easy to manufacture compared to the complicated design of the sealing rings now available in the industry.

Another object of the subject invention is to provide an elastic sealing ring which acts like a sleeve gasket fitting into an annular T-slot formed by members in the housing, and which is radially deformed by a pressure medium introduced into the annular slot. With such an arrangement for a sealing ring, one of the above objects of the present invention is realized; namely, the separation of the sealing ring from the support elements or pressure plates.

And yet a still further object of the present invention is to provide a support ring for the sealing ring which is formed onto the inner side of the housing as a radial projection. This support ring, which functions as an axial support for the elastic seal, is invariable in its inner diameter, i.e., it cannot be moved in the radial direction as is the case in the known art. Since the pipe which is to be tested may be introduced into the pipe testing apparatus with its ends having an enlarged protective cap or sleeve, the inner diameter of the support ring is correspondingly large. Regardless of this inner diameter of the support ring, it has been shown that the spreading of the elastic sealing ring into the T-slot formed by both the support ring and other members in the housing is kept within reasonable limits such that a sufficiently long service life of the seal is achieved.

More favorably, the support ring is provided with rounded edges in the area where the sealing ring is caused to spread which lessens the wear of the elastic sealing ring.

These objects, as well as other novel features and advantages of the present invention, will be better appreciated when the following description of the preferred embodiments is read along with the accompanying drawings of which:

Some of the principles and operation of a hydrostatic pipe testing machine is disclosed in U.S. Pat. Nos. 2,907,202, and 4,237,723. It is to be noted that normally both ends of the pipe are positioned in testheads designed similarly to those disclosed in these U.S. patents.

Figure 1:
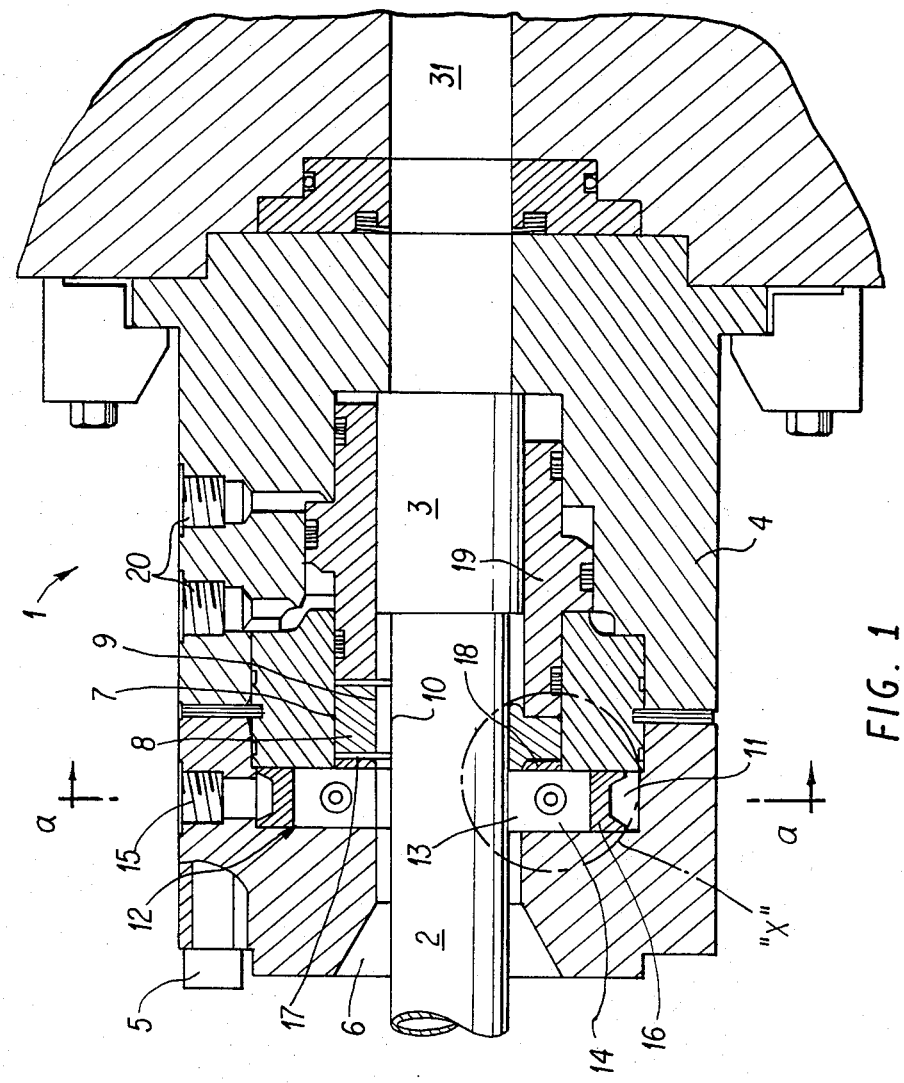
FIG. 1 is a cross-sectional view of a first embodiment for a sealing arrangement which follows the teachings of the subject invention.

In FIG. 1, a sealing arrangement in a testhead of a pipe testing apparatus is designated with the general number 1. In this arrangement, pipe 2 with an enlarged end 3 has already been positioned for the testing procedure which involves the introduction of pressurized fluid into the interior of pipe 2. In essence, the sealing arrangement consists of a housing 4, having two parts which are bolted together as is indicated at 5. Housing 4 shows a central bore 6 into which pipe 2 is inserted. Coaxially to the longitudinal axis of pipe 2 is a recess 7 in which elastic sealing ring 8 is located to fit around pipe 2. Once in this position, sealing ring 8 can be deformed in such a manner that its inner side 9 faced towards pipe 2 can be pressed into a sealing relationship against the external circumference 10 of pipe 2. This sealing condition is illustrated in the lower half of FIG. 1, while the non-sealing condition is designated in the upper half. On the side of the sealing ring 8 farthest away from the thickened end 3 of the pipe 2 a slot 11 also running coaxially to pipe 2 is provided in housing 4, into which an axial support ring 12 of variable diameter is inserted. A front portion 13 of ring 12 extends out of slot 11 in a manner to support elastic sealing ring 8 against any axial forces, when sealing ring 8 is in its operative positioning illustrated in the lower half of FIG. 1, as will be more clearly described shortly with reference to FIG. 1a.

Figure 2:
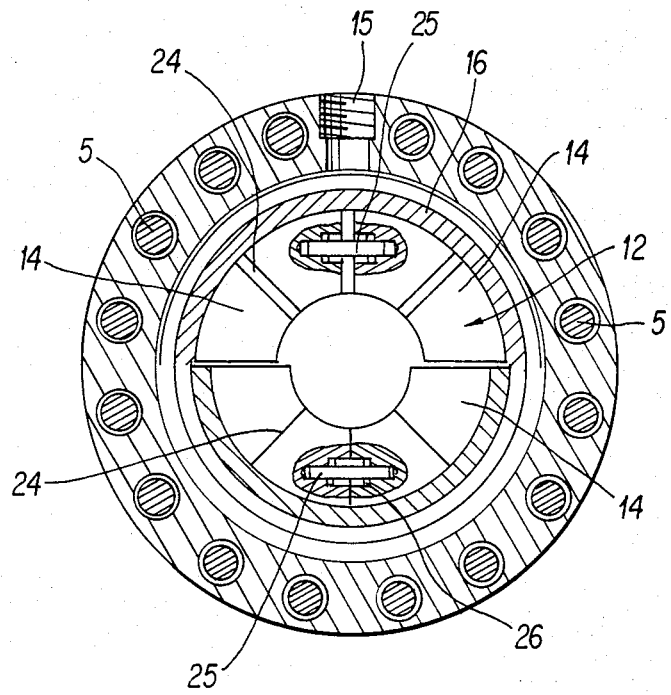
FIG. 2 is a cross section taken along lines a—a of FIG. 1

In referring to FIG. 2, axial support ring 12 consists of several supporting segments 14 which are radially divided and set off one from the other. As the bottom of FIG. 2 shows, these supporting segments 14 can be brought together radially against the pipe in a sealing fashion into the slot 11 through a sleeve gasket 16 which is hydraulically acted upon by pressure medium introduced into inlet 15. Conversely, bleeding of the pressure medium causes segments 14 to spread apart as shown in the upper half of FIG. 2.

Furthermore, between the part of the axial support ring 12 extending out of slot 11 and the front side 17 of the elastic sealing ring 8 faced toward the axial support ring, a flat support ring 18 is provided, being positioned radially by contacting member 18a, the inner diameter of which corresponds at least to the greater outer diameter of pipe 2 or, as the case may be, of its thickened end 3. The thickened end 3 of pipe 2 may be an integral threaded end or a threaded on sleeve.

For the deformation of elastic sealing ring 8, rotary piston 19 is provided, which in the upper half of FIG. 1 is in its resting or inoperative position and in the lower half of FIG. 1 is in its working or operative position. Support ring 18, rotary piston 19 and housing 4 forms a T-slot where sealing ring 8 is housed. Movement of rotary piston 19 towards sealing ring 8 is caused by introducing testing pressure directly through the pressure medium in-lets 20. As a result of this, rotary piston 19 is moved in its working position indicated in the lower half of FIG. 1, whereby it exerts a pressure on elastic sealing ring 8 to the extent ring 8 is deformed as is illustrated in the enlarged view of FIG. 1a.

Figure 1A:
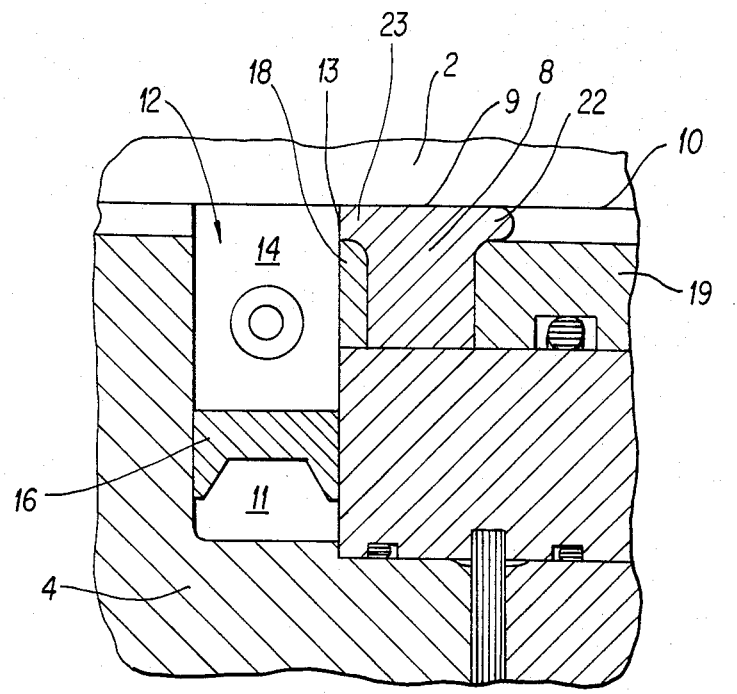
FIG. 1a is an enlarged section according to "X" in FIG. 1.

In this FIG. 1a, the same components are given the same numbers. As is seen in FIG. 1a, inner side 9 of elastic sealing ring 8 is pressed against the external circumference 10 of pipe 2, whereby sealing ring 8, as indicated by numerals 22 and 23, is caused to spread into the gap between piston 19 and external surface 10 of pipe 2, and between external surface 10 of pipe 2 and the space existing between external surface 10 and support ring 18.

The main compressive forces of the testing pressure introduced into pipe 2 work in a direction from right to left when referring to FIGS. 1 and 1a. The axial forces acting in such a way are counteracted upon by axial support ring 12 where its support segments 14, against external surface 10 of pipe 2, limit the deformation of elastic sealing ring 8 as shown at 23 in FIG. 1a. In order to reduce the wear between elastic sealing ring 8 and support ring 18, the support ring 18 is provided with rounded edges. Likewise, there are provided rounded edges on the portion of rotary piston 19 contacting ring 8, as best seen in FIGS. 1 and 1a.

FIG. 2, as mentioned previously, is a cross-sectional view taken along lines a—a of FIG. 1 and illustrates a number of bolts 5 which joins the two portions of housing 4 together. In this FIG. 2, the opened or inoperative positioning for the sealing arrangement is illustrated in the upper half and its closed or inoperative positioning is shown in its lower half. Also the same parts are indicated by the same numbers as those in FIG. 1. Segments 14 are connected to each other by holding pins 25 extending in opposing bores of two neighboring segments 14. These pins 25 support pressure springs 26 provided in each segment 14, which springs 26 serve for the mechanical spreading of segments 14.

Figure 3:
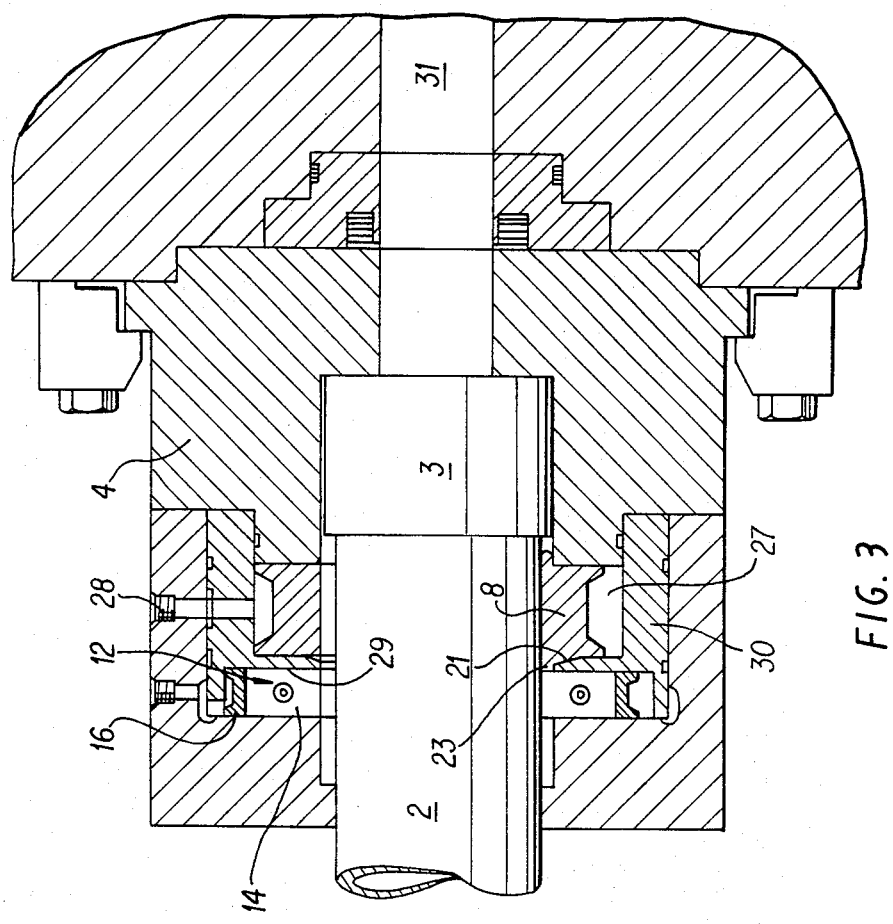
FIG. 3 is a cross-sectional view of a second embodiment of the subject invention.

A second embodiment of the subject invention is illustrated in FIG. 3, where elastic sealing ring 8, axial support ring 12 consisting of the several support segments 14, and sleeve gasket 16 surrounding support ring 12 are mounted in housing 4 in a similar fashion as that shown in FIGS. 1, 1a and 2. However, this second embodiment in FIG. 3 is distinguished from that of FIG. 1 in that no rotary piston is provided for the deformation of the elastic sealing 8. Rather, this design for a sleeve gasket is such that sealing ring 8 is led in a sealing fashion towards the external surface of pipe 2 in an annular T-slot 27 formed in housing 4. Pressure medium is introduced into inlet 28, against elastic sealing ring 8 thereby causing ring 8 to deform in a fashion illustrated in the lower portion of FIG. 3. Here as well, the deforming movement of elastic sealing ring 8 is limited by support segments 14 as indicated at 23, so that a safe axial support is given against the high axial forces developed during the pipe testing procedure. For simplification, support ring 18 of the first embodiment is replaced by a radial projection 29 extending from member 30 which is mounted tightly against the inside of housing 4. As shown at number 21 this projection 29 also has rounded or beveled edges, in the area where sealing ring 8 is caused to spread which rounded edges lessen the wear of elastic ring 8. It is to be noted that even though a sealing arrangement for one end of pipe 2 is shown in the figures that a similar sealing arrangement can be provided for the other end of pipe 2.

For the testing of pipe 2 with testing pressure created through the introduction of hydraulic fluid into pipe 2, the operation of the subject invention is as follows: The end of pipe 2 is positioned in a housing 4. The sleeve gasket 16 of both embodiments shown in the drawings is first acted upon by pressure medium in inlet 15 whereby axial support ring 12 is radially compressed to cause the segments 14 to be pressed against one another and against the external surface 10 of pipe 2. Then, in the embodiment of FIG. 1, rotary piston 19 is acted upon by pressure medium introduced into inlets 20 which deforms elastic sealing ring 8 in the fashion illustrated in the lower half of FIG. 1 to press against pipe 2 in a sealing fashion.

In the embodiment according to FIG. 3 the, axial sealing ring 8 is acted upon by pressure medium introduced in inlet 28, and likewise, is deformed in such a way that it is pressed against pipe 2 in a sealing fashion. Thereafter, or at the same time, pressure medium for the testing of pipe 2 is introduced through axial inlet bore 31 for testing the quality of pipe 2. The medium pressure introduced in inlets 15, 20, and 28 is constantly being supplied to force segments 14 and sealing ring 8 against pipe 2 in a manner that the initial sealing condition is always maintained throughout the pipe testing operation.

In accordance with the provisions of the patent statutes, we have explained the principle and operation of our invention and have illustrated and described what we consider to represent the best embodiment thereof.

We claim:

1. In a sealing assembly for a pipe tester or the like, in which fluid under pressure is introduced into the interior of the pipe and the ends of the pipe are sealed, comprising:

a housing having an aperture for receiving said end of said pipe, sealing ring means in said aperture through which said pipe is caused to pass, constructed in a manner to be deformable in opposite axial directions and radially towards and away from said pipe such that when deformed it will contact the external circumference of said pipe to form a sealing condition, supporting ring means arranged concentric to said pipe and adjacent said deformable sealing ring and to one side thereof, and constructed in a manner to contact said external circumference of said pipe and to control the extent of said deformation of said sealing ring means in a said axial direction on said one side when said sealing ring means is deformed, means for introducing pressure against said support ring means to effect its said contact against said pipe and said deformation of said sealing ring means, and forming means arranged in said aperture adjacent to and on both sides of said sealing ring means in a manner to cause said sealing ring means when deformed to be displaced in said opposite axial directions with respect to said pipe, and to create a sealing surface substantially larger in said deformed condition than in said non-deformed condition of said sealing ring means.

2. In a sealing assembly according to claim 1, wherein said forming means comprises a relatively flat annular member arranged between said sealing ring means and said supporting ring means and constructed in said housing in a manner to be spaced away from said external surface of said pipe.

3. In a sealing assembly according to claim 2, wherein said forming means further comprises rotary piston means constructed and arranged in a manner to be spaced away from said external surface of said pipe and to be movable axially to cooperate with said flat annular member to act upon said sealing ring means for said deformation thereof.

4. In a sealing assembly according to claim 2, wherein said forming means further comprises a fixed annular member located opposite said flat annular member and spaced away from said external surface of said pipe.

5. In a sealing assembly according to claim 1, wherein said forming means is constructed and arranged relative to said pipe positioned in said aperture in a manner to form a T configuration said sealing ring means spreads upon said deformation for said sealing.

6. In a sealing assembly according to claim 1, wherein said supporting ring means comprises several inner expandable segments and an outer expandable ring arranged concentrically around and in engagement with each of said segments.

7. In a sealing assembly according to claim 4, wherein said sealing ring means is acted upon radially relative to said pipe for said deformation for said enlargement of said sealing surface.

8. In a sealing assembly according to claim 6 or 7, wherein said supporting ring means and said sealing ring means is acted upon radially by introducing a pressure medium against said sealing ring means and said supporting ring means.

9. In a sealing assembly according to claim 3, wherein said movement of said rotary piston is caused by the introduction of a pressure medium axially relative to said pipe.

10. In a sealing assembly according to claim 2, wherein said flat annular member consists of a rounded portion which said sealing ring means contacts upon its said deformation in said axial direction towards said supporting ring means.

11. In a sealing assembly according to claim 1, wherein said forming means consists of a rounded portion which said sealing ring means contacts upon its said deformation in said axial directions.

12. In a sealing assembly according to claim 6, wherein said expandable segments are radially arranged and inter connected relative to each other through holding means.

* * * * *

UNITED STATES PATENT AND TRADEMARK OFFICE
CERTIFICATE OF CORRECTION

PATENT NO.   :   4,537,407
DATED        :   August 27, 1985
INVENTOR(S)  :   Herbert Jansen, Hans-Gunter Schiffers, and Richard Gerretz It is certified that error appears in the above-identified patent and that said Letters Patent are hereby corrected as shown below:

```
Column 6, line 26:

In claim 5:  After the phrase "T configuration" and
             before the phrase "said sealing ring means..."
             insert the word --wherein--.
```

Signed and Sealed this

Twenty-fourth Day of December 1985

[SEAL]

Attest:

DONALD J. QUIGG

Attesting Officer

Commissioner of Patents and Trademarks